April 4, 1967     H. N. BRAUNHUT     3,312,465
METHOD AND APPARATUS FOR MANUFACTURING A NOVELTY ITEM
Filed Feb. 13, 1964
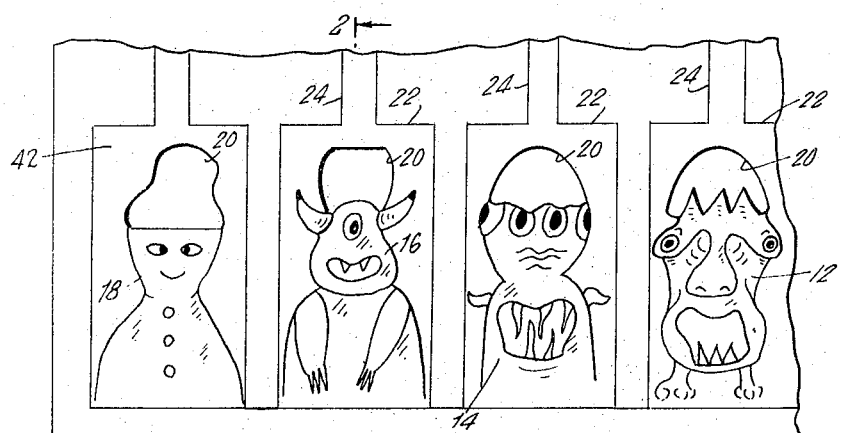
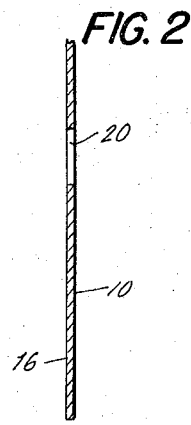
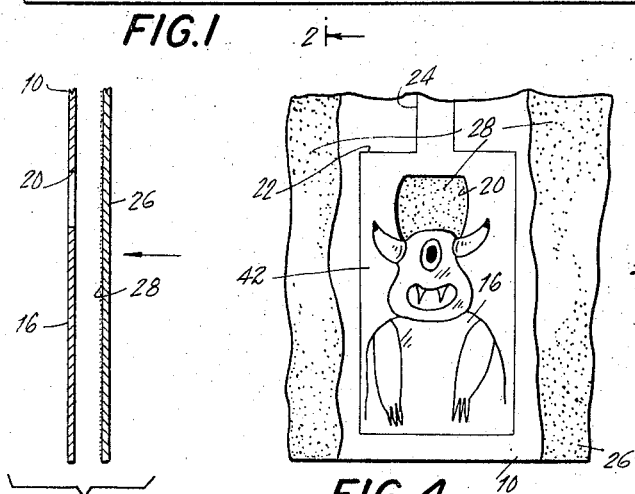
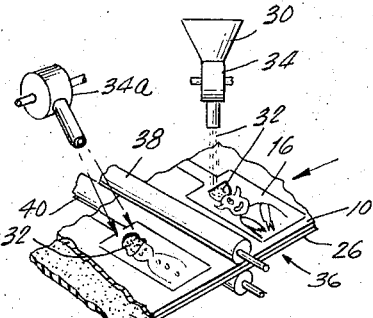
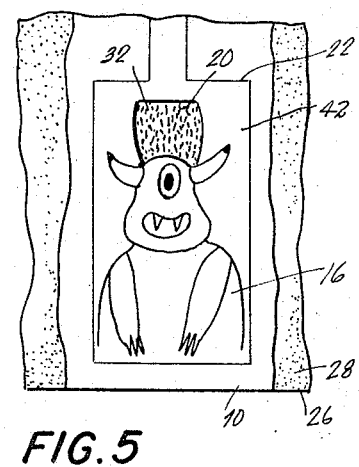
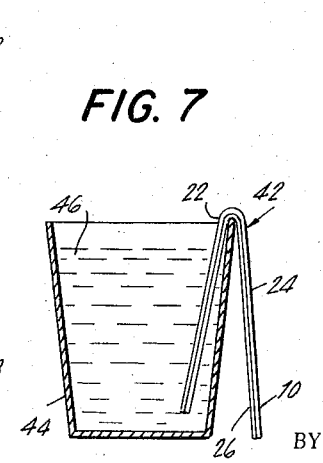
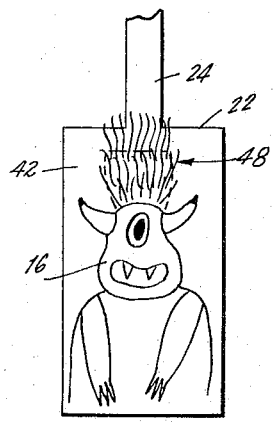
INVENTOR.
HAROLD N. BRAUNHUT
BY Friedman & Goodman
ATTORNEYS United States Patent Office 3,312,465
Patented Apr. 4, 1967

3,312,465
METHOD AND APPARATUS FOR MANU-
FACTURING A NOVELTY ITEM
Harold N. Braunhut, 1812 Atlantic Ave.,
Brooklyn, N.Y. 11233
Filed Feb. 13, 1964, Ser. No. 344,654
5 Claims. (Cl. 272—8)

In general, this invention relates to a new and improved method of manufacturing a novelty item, and more particularly, to a method of manufacturing a cardboard novelty item having a grotesque figure portrayed thereon with grass growing as a portion of the grotesque figure.

There has recently been developed a novelty item consisting of a cardboard piece which is placed partially in water with a portion extending out of the water. This novelty item has a grotesque figure portrayed on the portion of the cardboard outside of the water. To enhance the grotesque effect this portion has grass seed placed thereon which is supplied water by reason of the absorbent nature of the cardboard. The grass that grows on the cardboard out of the water forms a portion of the grotesque figure and enhances its overall appearance.

One of the main problems in manufacturing this novelty item has been the necessity to compensate between the absorbent nature of the cardboard material which enables it to transmit water to the grass seed on the cardboard out of the water, and the requirement that the grotesque figure be printed on the cardboard. Since absorbent cardboard cannot easily be printed upon to achieve extreme clarity and definition between colors and lines, a compromise had to be made between the absorbent nature of the cardboard and the type of coloring that would be utilized to print a grotesque figure.

Further, it was necessary to specially form the adhesive coating utilized to secure the grass seed to the cardboard portion in order to give shape to the grass as it was grown with respect to the grotesque figure.

Accordingly, it is the general object of this invention to avoid and overcome the foregoing and other difficulties of prior art practices by the provision of a new and better method of manufacturing a novelty item.

Another object of this invention is the provision of a new and better method of manufacturing a novelty item which can be simply and easily accomplished without the necessity for special care in applying adhesive to the cardboard surface thereof.

Still another object of this invention is the provision of a new and better method of manufacturing novelty items utilizing cardboard which enables the item to be printed upon without loss of clarity or definition.

A further object of this invention is the provision of a new and better method of manufacturing the novelty item which is simple and easy to operate, and achieves better results in a more inexpensive manner.

Other objects and advantages of the invention will become apparent from the following specification, reference being had to the accompanying drawings in which:

FIGURE 1 is a top plan view of the sheet of printed material utilized in producing the novelty item in the present invention.

FIGURE 2 is a cross-sectional view of the sheet of FIGURE 1 taken along lines 2—2.

FIGURE 3 shows the second step in manufacturing the novelty item in accordance with the principles of the present invention.

FIGURE 4 is a showing of the third step in manufacturing the novelty item in the present invention.

FIGURE 5 is a view similar to FIGURE 4 after completion of the step of FIGURE 4.

FIGURE 6 shows the next step in manufacturing the novelty item in accordance with the principles of the present invention.

FIGURE 7 is a cross-sectional view of the novelty item manufactured by the method of the present invention placed in a glass of water.

FIGURE 8 shows the novelty item manufactured in accordance with the principles of the present invention after soaking in the glass of water as noted in FIGURE 7 for a period of time.

In FIGURE 1, there is shown a sheet of smooth finished paper 10 which can be easily printed on in all colors. The paper 10 has a hard gloss finish and has printed thereon a plurality of grotesque figures 12, 14, 16 and 18. Each of the grotesque figures 12, 14, 16 and 18 has a dye cut-out portion 20 where the hair of the grotesque figure would normally have been printed. Each grotesque figure 12, 14, 16 and 18 is within a separate square 22 having an integral longitudinal extension 24.

As shown in FIGURE 3, the second step in manufacturing the novelty item in the present invention comprises placing a cardboard backing sheet 26 having an adhesive coating 28 thereon against the back surface of the sheet 10. The cardboard back-up sheet 26 is manufactured of a highly absorbent material capable of optimum use in accordance with the principles of the novelty item as will be discussed with respect to FIGURES 7 and 8. As shown in FIGURE 4, the article thus far manufactured has an upper surface on which is formed the grotesque figure 16, and a back sheet 26 of cardboard adhesively secured thereto. The opening 20 has the adhesive coating 28 therein. As shown in FIGURE 6, there is provided a suitable hopper 30 adjacent the sheet of material and above the grotesque figure 16. The hopper 30 has grass seed 32 therein which is slowly fed out the bottom of the hopper 30. A blower 34 blows the grass seed 32 over the upper sheet 10. Blower 34a, shown in FIGURE 6, may be provided if desired, to blow excess grass seed away after the rolling step, in addition to or instead of blowing it away before the rolling step by the use of blower 34. The grass seed on the upper sheet 10 falls within the dye cut opening 20 onto the adhesive surface 28 and is secured thereto. The grass seed 32 is then blown off the upper surface of the sheet 10 by means of air blower 34a. The only grass seed that will remain is that which has been secured by the adhesive 28 within the dye cut opening 20, since the space defined by the opening 20 provides a recess or pocket within which a substantial amount of seed may be received without danger of being crushed or rubbed off.

The now formed laminate 36 is fed between pressing rolls 38 and 40 to press the grass seed 32 into place on the adhesive 28.

The next step in manufacturing the novelty item in accordance with the principles of the present invention is to cut out each novelty item 42 by cutting along the lines defining the box 22 and tab 24. Once the novelty items 42 are cut out, they can be utilized in the manner shown in FIGURE 7. That is, the novelty item has its tab 24 bent over the edge of a glass 44 having water 46 therein. The water 46 is absorbed by the cardboard sheet 26, of the item 42, and is transmitted to the box portion 24. The portion 24 is outside of the water. As shown in FIGURE 3, the cardboard sheet 26 which absorbs the water 46 extends over the opening 20 and is visible therethrough. Water which reaches the dye cut opening 20 is fed to the grass seed 32. Accordingly, the grass seed 32 can grow, and in normal use when the grass seed is kept out of direct sunlight and the tab 24 is placed in three inches of water at all times, the grass seed will grow into grass 48 in seven days and continue to grow for from three to five weeks. This grass 48 enhances the appearance of the grotesque figure 16.

It should be noted that it was not necessary to print the grotesque figures 12, 14, 16 and 18 on the cardboard 26 because of the laminate method of manufacturing the item. Further, it was not necessary to shape the adhesive coating in accordance with the desired shape of the grass to be grown.

By utilizing a dye cut-out of the printed sheet, the novelty item could be manufactured accurately without the necessity for intricate manufacturing operations.

Thus, it can be seen that the present invention achieves the objects hereinbefore set forth in a simple and easy manner. It will be understood that modifications and variations of the present invention may be effected without departing from the spirit and scope of the normal concepts herein.

I claim as my invention:

1. A method of manufacturing a novelty item comprising the steps of providing a first sheet of paper, said first sheet having at least one glossy surface, printing figures on spaced portions of said glossy surface, cutting out predetermined portions of said figures, providing a second sheet of paper, said second sheet being of highly water-absorbent paper compared to said first sheet, coating at least a portion of said second sheet with adhesive, adhesively securing said first sheet to said second sheet to expose areas of said second sheet through said cutout portions of said first sheet, said exposed areas being substantially completely coated with adhesive, spreading particles over said first sheet to adhesively secure said particles only in said cut-out portions, and cutting out said figures from said adhesively secured first and second sheets of paper.

2. The method of manufacturing the novelty item of claim 1 wherein the step of spreading includes spreading grass seed over said first sheet to secure said grass seed in said cut-out portions of said figures, and including the step of blowing away excess grass seed from said printed surface.

3. The method of manufacturing of claim 2 including the step of pressing said grass seed in said cut-out portion after the step of blowing said grass seed is completed.

4. The method of manufacturing a novelty item comprising the steps of providing a first sheet of glossy paper, printing spaced grotesque figures on said paper, cutting out portions of the grotesque figures on said first sheet which would normally form the hair of the grotesque figures, providing a second sheet of water absorbent paper, adhesively coating one surface of said water absorbent paper, pressing the surface of said first sheet opposite from said printed surface against said second sheet one surface, blowing grass seed over said first sheet printed surface to adhesively secure said grass seed only in said cut-out portions, blowing away grass seed which is not in said cut-out portions from said printed surface, pressing said first and second sheets between rollers to adhesively secure said grass seed to said adhesive coated one surface of said second sheet and said first sheet to said second sheet, and cutting out each grotesque figure from the adhesively secured first and second sheets to form individual novelty items.

5. A novelty item comprising a first sheet having a predetermined cut-out portion formed therein, a back-up sheet having a coating of adhesive material disposed on one surface thereof, said adhesive coating covering substantially all of said second sheet in the area underlying said cut-out portion and at least a portion of said second sheet in the area not underlying said cut-out portion, said back-up sheet being secured to said first sheet by means of said adhesive coating and grass seed disposed in the area defined by said cut-out portion and secured in position by means of the portion of said adhesive coating underlying the area defined by said cut-out, said second sheet being a sheet of bibulous paper, said first sheet being a glossy paper of lower absorbency than said second sheet.

References Cited by the Examiner

UNITED STATES PATENTS

| | | | |
|---|---|---|---|
| 2,026,322 | 12/1935 | Raines | 35—20 X |
| 2,533,985 | 12/1950 | Aronstein et al. | 156—280 X |
| 2,853,830 | 9/1958 | Herzog | 46—35 |
| 2,963,797 | 12/1960 | Mueller | 35—26 |

FOREIGN PATENTS 551,846  3/1943  Great Britain.

OTHER REFERENCES

Johnson Smith & Co., catalog, received U.S. Patent Office, July 9, 1952, Detroit 7, Michigan, #5984 relied on.

"Playthings," vol. 62, #1, January 1964, p. 101 relied on.

RICHARD C. PINKHAM, *Primary Examiner.*

L. J. BOVASSO, *Assistant Examiner.*